United States Patent
Sato

(10) Patent No.: US 6,289,009 B1
(45) Date of Patent: Sep. 11, 2001

(54) CDMA TRANSCEIVER USED IN MOBILE COMMUNICATION SYSTEM

(75) Inventor: Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/119,989

(22) Filed: Jul. 21, 1998

(30) Foreign Application Priority Data

Jul. 22, 1997 (JP) .................................................. 9-195387

(51) Int. Cl.[7] .............................. H04B 7/216; H04B 1/38
(52) U.S. Cl. ........................ 370/342; 455/522; 455/116
(58) Field of Search ................................... 370/313, 318, 370/320, 321, 326, 328, 329, 332, 335, 336, 342, 345, 347, 349, 350; 455/69, 38.3, 343, 522, 115, 116, 126

(56) References Cited

U.S. PATENT DOCUMENTS

| 5,241,542 | * | 8/1993 | Natarajan et al. | 370/311 |
|---|---|---|---|---|
| 5,278,835 | * | 1/1994 | Ito et al. | 370/311 |
| 5,390,361 | * | 2/1995 | Seppala | 455/126 |
| 5,392,287 | * | 2/1995 | Tiedemann, Jr. et al. | 370/311 |
| 5,539,748 | * | 7/1996 | Raith | 370/329 |
| 5,559,789 | * | 9/1996 | Nakano et al. | 370/342 |
| 5,751,763 | * | 5/1998 | Bruckert | 375/200 |
| 5,999,830 | * | 12/1999 | Taniguchi et al. | 455/574 |
| 6,101,218 | * | 8/2000 | Nagano | 375/224 |

FOREIGN PATENT DOCUMENTS 62 45232   2/1987 (JP) .

* cited by examiner

Primary Examiner—Kwang B. Yao
(74) Attorney, Agent, or Firm—Ostrolenk, Faber, Gerb & Soffen, LLP

(57) ABSTRACT

When transmission power control bit data is transmitted from a base station, a transmission power control circuit controls the transmission power of a transmitting amplifier and the transmission power on-off ratio according to the transmission power control bit. That is, the mean transmission power is determined according to the transmission power control bit data. At this time, the transmission "on" time ratio is reduced as much as possible according to:

(mean transmission power)=(transmission power when transmission is "on")×(transmission "on" time ratio), and (transmission power when transmission is "on")
(transmission power when transmission is "on")
(maximum transmission power of transmitting amplifier).

5 Claims, 3 Drawing Sheets

CDMA TRANSCEIVER USED IN MOBILE COMMUNICATION SYSTEM

BACKGROUND OF THE INVENTION

The present invention relates to mobile communication systems and, more particularly, to Code Division Multiple Access (CDMA) transceivers used for car telephones and portable telephone systems (cellular systems) using direct spread CDMA (DS-CDMA) systems.

As a cellular system using a CDMA system, what is described in North American Standards TIA/EIA IS-95 is well known in the art. In this IS-95, one frame (20 ms) divided into 16 slots having a time length of 1.25 ms, and the transmission power is controlled for each slot.

Specifically, the base station measures the reception quality for each slot, and compares the measured quality with a predetermined desired quality. When the measured quality is superior to the desired quality, the base station instructs the mobile station to reduce the transmission power. When the measured quality is inferior to the desired quality, on the other hand, the base station instructs the mobile station to increase the transmission power. As a transmission power level command to the mobile station, the base station transmits transmission power control bit data to the mobile station. The transmission power control bit data is multiplexed with communication channel data transmitted from the base station to the mobile station.

The mobile station separates the transmission power control bit data by de-multiplexing from the received multiplexed communication channel data. When the command from the base station is to increase the transmission power, the mobile station increases the transmission power of the next slot from the present (or prevailing) slot transmission power by 1 dB. When the command is to reduce the transmission power, on the other hand, the transmission power of the next slot is reduced from the prevailing slot transmission power by 1 dB.

In the cellular system using the CDMA system, unless data received from the individual mobile stations are of uniform quality, it becomes impossible for the base station to receive data of inferior quality, thus resulting in a system failure.

In the cellular system the mobile stations can be moved freely within the service area, and the quality of the received data is greatly varied in dependence on the transmission loss due to distance from the base station, shadowing due to interruption of the transmission line, and multi-path fading due to transmission of reflected wave s along a plurality of transmission lines. In order to cope with such data quality variations, the CDMA mobile station described in the IS-95 should accurately control the transmission power within in a range of 60 to 80 dB (of 1 dB or below, for instance).

In the reverse link (i.e., in increments transmission from the mobile station and received in the base station), one of four different bit rates, i.e., 9.6, 4.8, 2.4 and 1.2 kbps, can be selected for transmission and reception. Thus, variable rate transmission at ½, ¼ and ⅛ of 9.6 kbps as basic bit rate, for instance, is realized by thinning down the transmission data to ½, ¼ and ⅛, respectively. Specifically, one frame (20 ms) is divided into 16 slots having a time length of 1.25 ms, and the transmission is allowed in all the 16 slots when the basic rate of 9.6 kbps is selected for transmission, while it is allowed in 8, 4 and 2 slots per frame when the bit rates of 4.8, 2.4 and 1.2 kbps are selected, respectively, that is, no transmission is allowed in the other slots.

As shown above, in the transmission power control in CDMA, the reception quality per bit (i.e., $E_b/I_o$: the ratio between reception power $E_b$ and interference power $I_o$ per 1 Hz per bit) should be made constant.

In the reverse link described in the IS-95, the reception quality ($E_d/I_o$) is controlled to be constant by varying the transmission slot number, i.e., the transmission on-off ratio, according to the transmission bit rate. However, the transmission on-off ratio is determined absolutely by the transmission bit rate, and not varied according to the transmission power.

A method of transmission power control in variable bit rate transmission is disclosed in a spread spectrum power transmission system shown in Japanese Laid-Open Patent Publication No. 5-102943. In this system, the spread rate is made variable according to the transmission bit rate, and the transmission power is controlled in reverse proportion to the spread rate. The transmission power per bit is thus made constant. However, the transmission is always made continuously irrespective of the transmission bit rate.

A transmission power control method is also disclosed in a spread spectrum communication system shown in Japanese Laid-Open Patent Publication No. 63-313932. In this system, the inter-transceiver distance is detected from the phase difference between spread code for transmission and that for reception. However, although the transmission power is controlled according to the detected distance, the transmission on-off ratio is not varied according to the transmission power.

In a system like the reverse link as disclosed in the IS-95, in which in a constant bit rate range the transmission power is increased or reduced in units of 1 dB without varying the transmission "on" time ratio or the spread rate, the transmission power of the mobile station should be controlled accurately in a control range of 60 dB (or 80 dB). Therefore, it is a problem that the design of the power amplifier (or transmitting amplifier) of the mobile station is complicated.

In addition, for linear operation of the transmitting amplifier with a broad dynamic range, it is necessary to operate the transistor of the transmitting amplifier with the same current as in the transmission with the maximum transmission power. Therefore, the power efficiency is inferior.

SUMMARY OF THE INVENTION

An object of the present invention is to provide a CDMA transceiver which permits circuit simplification by decreasing the dynamic range required for the transmission power amplifier (or transmitting amplifier).

Another object of the present invention is to provide a CDMA transceiver, which permits reduction of the current consumption of the transmitting amplifier by increasing the transmission "off" time.

According to the present invention, there is provided, in a mobile communication system comprising a base station and one or more mobile stations for communication using a direct spread code division multiple access system, a CDMA transceiver used in the mobile station determines mean transmission power on the basis of a transmission power control signal from the base station and changing the transmission on-off ratio of a transmitting amplifier based on the determined mean transmission power.

The data from the mobile station has frames of a predetermined time length, the frames each having N (N being 2 or a greater integer) slots of a predetermined time length, the control means on-off controlling transmission to change the transmission on-off ratio for each slot. The control means controls transmission to be done only in one slot when the mean transmission power is lower than 1/N of the maximum transmission power of the transmitting amplifier, and in m (m being an integer in a range between 2 and N) slots when the mean transmission power is set to be higher than 1/N of the maximum transmission power of the transmitting amplifier.

The control means does continuous transmission control when the mean transmission power is higher than a predetermined threshold level and intermittent transmission control when the mean transmission power is lower than the predetermined threshold level. The threshold level is lower than (N−1)/N of the maximum transmission power of the transmitting amplifier.

According to another aspect of the present invention, there is provided a CDMA transceiver in mobile station which receives a transmission power control bit data from a base station, the control bit data being determined such that the quality of data received in the base station is uniform over all channels, the transceiver determining the mean transmission power on the basis of the transmission power control bit data and controlling a transmission "on" time ratio based on the mean transmission power.

The transmission power control bit data is multiplexed with the communication channel data transmitted from the base station to the mobile station. The transmission power control bit data may be a one-bit data instructing the increase or reduction of the prevailing transmission power by only 1 dB. Alternatively, the transmission power control bit data may be a plurality of bits directly instructing the transmission power.

According to an other aspect of the present invention, there is provided a CDMA transceiver in a mobile station which determines the mean transmission power on the basis of received power data from a base station, and controls a transmission "on" time ratio based on the determined mean transmission power.

The determined mean transmission power is compared with the maximum power capable of being transmitted by a transmitting amplifier, and when the mean transmission power is lower than (N−1)/N times the maximum transmission power, an intermittent transmission is performed.

As shown above, in the CDMA transceiver according to the present invention, the transmission power is determined by varying the transmission on-off ratio according to the value of received transmission power control command (i.e., transmission power control bit data). Thus, not only it is possible to reduce the transmission power range (dynamic range) of the transmitting amplifier, but it is possible to reduce the transmission "on" time ratio and reduce the current consumption of the transmitting amplifier.

Other objects and features will be clarified from the following description with reference to attached drawings.

PREFERRED EMBODIMENTS OF THE INVENTION

Preferred embodiments of the present invention will now be described with reference to the drawings.

Figure 1:
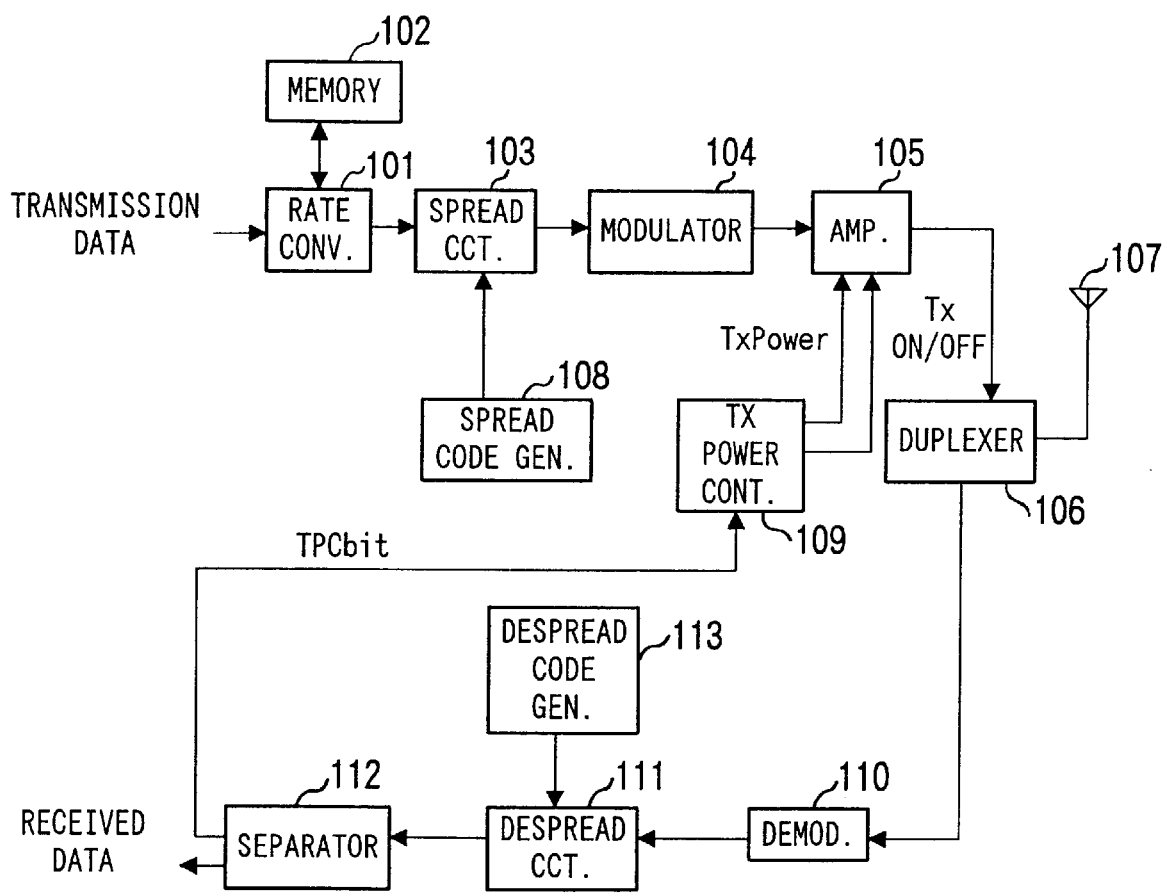
FIG. 1 shows an exemplified block diagram according to the present invention.

Referring to FIG. 1, the illustrated CDMA transceiver obtains the mean transmission power, which is given by the following equation, in response to an instruction from a base station (not shown).

(mean transmission power)=(transmission power when transmission is "on")×(transmission "on" time ratio), and (transmission power when transmission is "on")≦(maximum transmission power of transmitting amplifier)

The illustrated CDMA transceiver comprises a rate converter 101 for converting the data transmission rate and a memory 102, a spread circuit 103 and a spread code generator 108 for causing spread spectrum, a modulator 104 for frequency converting the transmission signal from a base band signal to a radio signal, a transmitting amplifier 105 for power amplifying the radio signal, a duplexer 106 for using an antenna 107 commonly for both transmission and reception, a demodulator 110 for frequency converting a received radio signal to a base band signal, a despread circuit 111 and a despread code generator 113 for despreading the received signal (i.e., base-band signal), a separator 112 for separating the received data and transmission power control bit (TPC bit) from the received signal by multiplex separation, and a transmission power controller 109 for controlling the transmission power (Tx power) of the transmitting amplifier and the transmission on-off ratio (Tx "on"/"off") according to a value represented by the received transmission power control bit.

Figure 3:
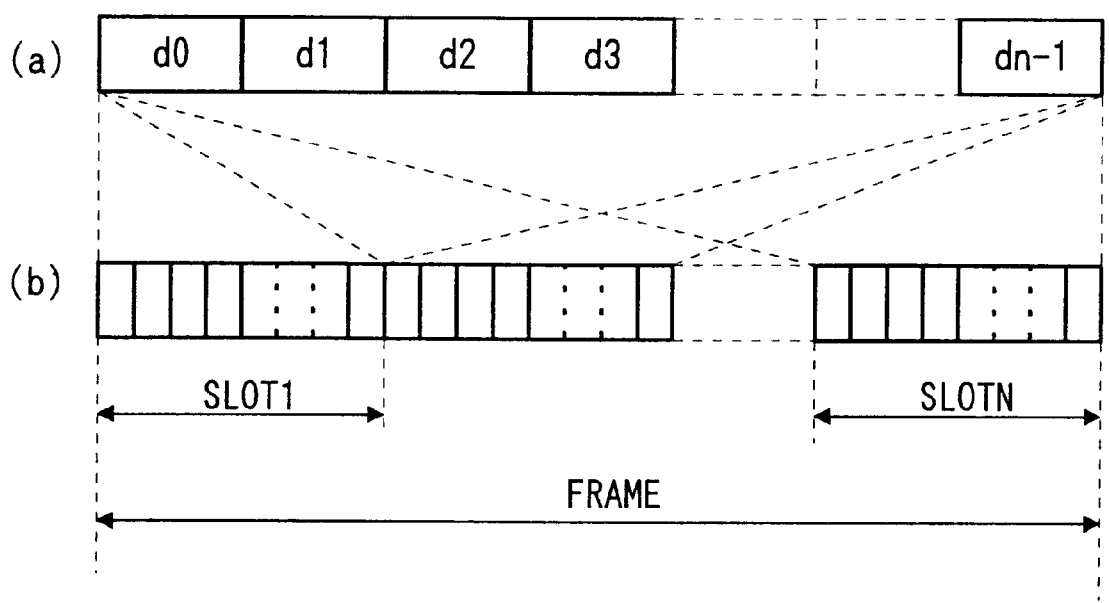
FIG. 3 shows the data transmission rate conversion and data transmission in units of slots.

The data transmission rate conversion and data transmission in units of slots will now be described with reference to FIG. 3. One frame is divided into N (N being 2 or a greater integer) slots. In a case where, for instance, the frame time length is 5 ms, the slot time length is 312.5 $\mu$s and the number N of slots in one frame is N=16, transmission data (shown in FIG. 3(a)) is outputted N times repeatedly at N times the feed rate (FIG. 3(b)). That is, the same data is outputted repeatedly in each of N slots. The memory 102 is used to tentatively store the transmission data which is outputted repeatedly.

As in the usual CDMA transceiver, the transmission data which is outputted repeatedly as described above, is spread in the spread circuit 103 according to spread code data from the spread code generator 108, and then frequency converted in the modulator 104 to a radio signal. The radio signal is fed through the transmitting amplifier 105, the duplexer 106 and the antenna 107 for transmission therefrom. The spread code generator 108 usually generates a psuedo random series having a sufficiently long cycle compared to the bit rate(for instance, M series or Gold code series). The psuedo random series is used as a spread code series. While the transmission data is outputted repeatedly for each of N slots, the spread code series usually varies with the slot.

As described above, in the CDMA mobile communication system the transmission power should be controlled such that the quality of data received in the base station or stations is uniform over all channels. In the illustrated CDMA transceiver (i.e., mobile station), the mean transmission power is determined according to the transmission power control bit data (TPCbit) which is multiplexed with downgoing data from the base station. That is, the transmission power control bit data is transmitted from the base station to the mobile station such that it is multiplexed with the communication channel data transmitted from the base station to the mobile station. The signal transmitted from the base station is coupled via the antenna 107 and the duplexer 106 to the demodulator 110 for demodulation to the baseband signal. The despread circuit 111 despreads the baseband signal according to a despread code from the despread code generator 113. The separator 112 separates the received communication data and transmission power control bit data from the despread data.

The transmission power control bit data (TCPbit) is a transmitted as power control command from the base station to the mobile station. As in the prior art, the power control command may be a one-bit data instructing the increase or reduction of the prevailing transmission power by only 1 dB, or it may be data of a plurality of bits directly instructing the transmission power. Generally, when performing a fast transposition power control capable of following the fading, the former data is used, while the latter data is used when performing a slow transmission power control following only variations in the transmission path with attenuation with distance without following the fading.

While the illustrated case is concerned with well-known closed-loop transmission power control, in which the base station measures the reception quality and transmits bit data for controlling the transmission power of the base station or stations, the same principle of the present invention is also applicable to the case of open-loop transmission power control, in which the mobile station measures the level of down-going received data and estimates the characteristics of the up-going transmission line from the result of the measurement.

The transmission power control circuit 109 determines the mean transmission power (Tx power) according to the transmission power control bit data, and compares this mean transmission power with the maximum power capable of being transmitted by the transmitting amplifier 105 (hereinafter referred to as the maximum transmission power). When the mean transmission power is lower than (N−1)/N times the maximum transmission power, that is, when it is possible to meet the mean transmission power even without transmission of at least one slot among N slots constituting one frame, the control circuit 109 controls the transmitting amplifier 105 such as to cause intermittent transmission.

By reducing the transmission "on" time ratio of the transmitting amplifier 105, the power consumption can be reduced.

By reducing the ratio of the mean transmission power to the maximum transmission power, the transmission power control circuit 109 reduces the number of slots in the actual transmission to reduce the transmission on/off ratio. When the mean transmission power becomes 1/N of the maximum transmission power, the transmission power control circuit 109 holds the transmission of the transmitting amplifier 105 "on" for only one slot. During this slot, the transmission power is equal to the maximum transmission power. However, since the transmission "on" time ratio is 1/N, the mean transmission power is 1/N of the maximum transmission power of one frame.

Figure 2:
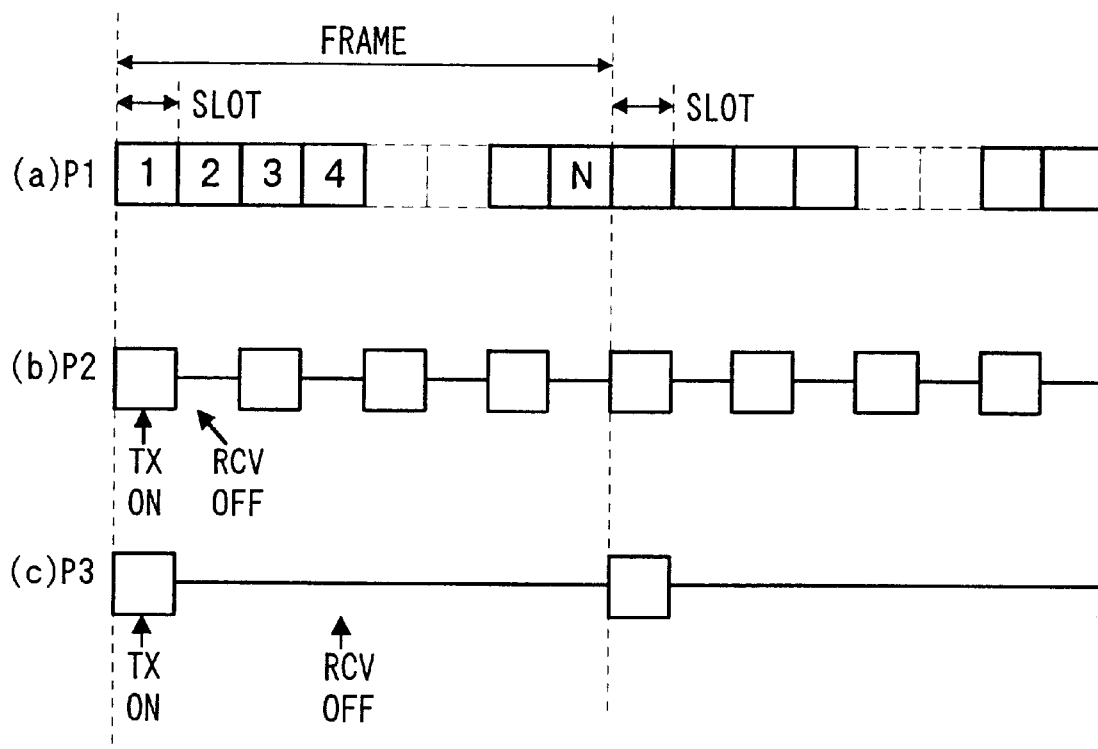
FIG. 2 shows changes in numbers of slots of actual transmission according to the mean transmission power.

FIG. 2 shows changes in numbers of slots of actual transmission according to the mean transmission power. When the mean transmission power is substantially equal to the maximum power transmission, the transmission is made in all the slots as shown at P1 in (a) of FIG. 2.

When the mean transmission power is substantially equal to 1/N of the maximum power, the transmission is on-off controlled (with transmission on-off ratio of 1:1) as shown at P2 in (b) of FIG. 2. When the mean transmission power is lower than 1/N of the maximum power transmission, the transmission is caused in only one slot in each frame as shown at P3 in (c) of FIG. 2.

The variation of the transmission on-off ratio according to the ratio between the mean transmission power and the maximum transmission power in the above manner will not result in any missing data, because the same data is transmitted in N slots. The base station may carry out data synthesis from the data in the transmission "on" slots after despread. When the transmission is made in m (m being a positive integer between 2 and N) slots, the reception power after synthesis from the received data in m slots is m times the reception power in one slot.

While the above description is concerned with the case in which the number of slots used can be any number from 1 to N, it is possible to limit the selectable numbers of slots to simplify the construction of the transceiver. For example, it describable to limit the selection to two cases, i.e., one in which the transmission is made in only one slot, and one in which the transmission is made in all of N slots. Lest the number slots used should be changed frequently, a hysteresis may be provided for each number of slots which can be switched.

By way of example, assuming that the number N of slots used per frame is N=16, it is possible to use a transmitting amplifier with less dynamic range by 10 log (16)=12 dB. In addition, the transmission on-off ratio may be reduced to $\frac{1}{16}$, and thus the current consumption can be greatly reduced.

As has been described in the foregoing, according to the invention it is possible not only to reduce the dynamic range required for the CDMA transceiver transmitting amplifier but also to reduce the mean transmission on-off ratio thereof. changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A CDMA transceiver used in a mobile station in a mobile communication system comprising a base station and one or more mobile stations for communication using a direct spread code division multiple access system, wherein the CDMA transceiver determines a mean transmission power on the basis of a transmission power control signal received from the base station, the mean transmission power being equal to the transmission power when transmission is "on" multiplied by a transmission "on" time ratio;

the CDMA transceiver changes the transmission "on" time ratio of a transmitting amplifier based on the determined mean transmission power;

the mobile station transmits data in frames of a predetermined time length, the frames each having N (N being an interger equal to 2 or greater) slots of a predetermined time length, the transceiver comprising a controller which on-off controls the transmission of the data to change a transmission on-off ratio for each slot; and the controller controls the transmission to be performed only in one slot when the mean transmission power is lower than 1/N of a maximum transmission power of the transmitting amplifier, and in m (m being an integer in a range between 2 and N inclusive) slots when the mean transmission power is higher than 1/N of the maximum transmission power of the transmitting amplifier.

2. A CDMA transceiver used in a mobile station in a mobile communication system comprising a base station and one or more mobile stations for communication using a direct spread code division multiple access system, wherein the CDMA transceiver determines a mean transmission power on the basis of a transmission power control signal received from the base station, the mean transmission power being equal to the transmission power when transmission is "on" multiplied by a transmission "on" time ratio;

the CDMA transceiver chances the transmission "on" time ratio of a transmitting amplifier based on the determined mean transmission power;

the mobile station transmits data in frames of a predetermined time length, the frames each having N (N being an interger equal to 2 or greater) slots of a predetermined time length, the transceiver comprising a controller which on-off controls the transmission of the data to change a transmission on-off ratio for each slot; and the controller performs continuous transmission control when the mean transmission power is higher than a predetermined threshold level and intermittent transmission control when the mean transmission power is lower than the predetermined threshold level.

3. The CDMA transceiver according to claim 2, wherein the threshold level is lower than (N-1)/N of a maximum transmission power of the transmitting amplifier.

4. A CDMA transceiver in a mobile station which receives transmission power control bit data from a base station, determined such that the quality of data received in the base station is uniform over all channels, wherein the CDMA transceiver determines a mean transmission power on the basis of the transmission power control bit data, the mean transmission power being equal to the transmission power when transmission is "on" multiplied by a transmission "on" time ratio, the CDMA transceiver controls the transmission "on" time ratio based on the mean transmission power; and the determined mean transmission power is compared with a maximum power capable of being transmitted by a transmitting amplifier, and when the mean transmission power is lower than (N−1)/N times the maximum transmission power, an intermittent transmission is performed, where N is the number of slots in a transmission frame, N being an integer which is greater than or equal to 2.

5. A CDMA transceiver in a mobile station which determines a mean transmission power on the basis of received power data from a base station, the mean transmission power being equal to the transmission power when the transmission is "on" multiplied by a transmission "on" time ratio, and controls the transmission "on" time ratio based on the determined mean transmission power, wherein the determined mean transmission power is compared with a maximum power capable of being transmitted by a transmitting amplifier, and when the mean transmission power is lower than (N−1)/N times the maximum transmission power, in intermittent transmission is performed, where N is the number of slots in a transmission frame, N being an integer which is greater than or equal to 2.

* * * * *